Jan. 8, 1963 — W. H. KUNZ — 3,071,976
CONTROL APPARATUS
Filed April 27, 1960 — 2 Sheets-Sheet 1
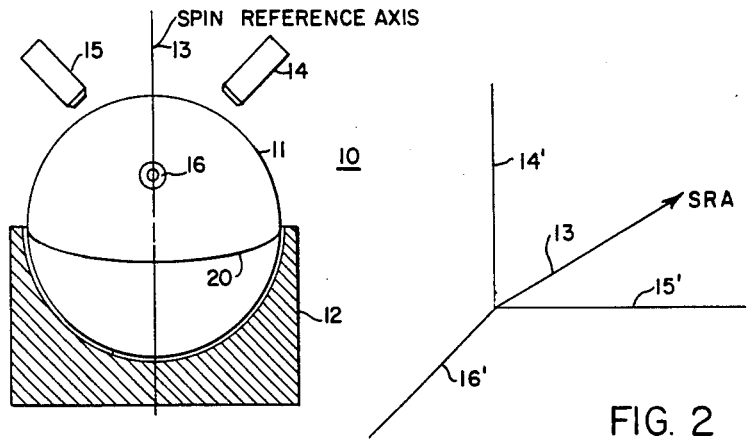
FIG. 1
FIG. 2
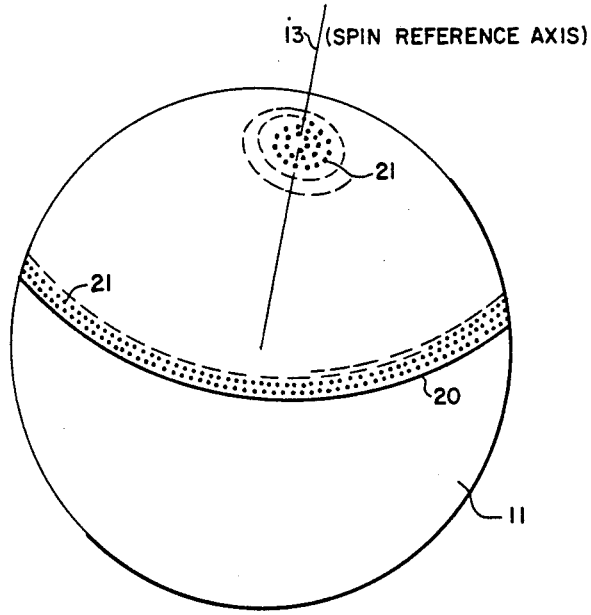
FIG. 3
INVENTOR
WALDEN H. KUNZ
BY Roger W. Jensen
ATTORNEY United States Patent Office 3,071,976
Patented Jan. 8, 1963

3,071,976
CONTROL APPARATUS
Walden H. Kunz, Seattle, Wash., assignor to Minneapolis-Honeywell Regulator Company, Minneapolis, Minn., a corporation of Delaware
Filed Apr. 27, 1960, Ser. No. 25,050
5 Claims. (Cl. 74—5.6)

This invention pertains to means, in combination with a support member and a spherically shaped rotor member universally supported on said support member and adapted to spin relative to said support member about a spin axis, for sensing and measuring relative rotation between said support member and said rotor member about any axis which is at an angle to the spin axis.

The present invention has application to the field of inertial instruments and more specifically to the field of gyroscopic instruments comprising in part a spherically shaped rotor element universally supported for rotation by suitable means on a support member. The rotor element is adapted to be rotated about a fixed spin axis and hence will tend to remain fixed in inertial space except for precessional errors. When there is rotational movement of the support member in space, there will be produced an apparent relative rotation between the rotor element and the support. Heretofore it has been difficult to provide an accurate measurement of said relative rotation. The present invention provides a unique means for measuring said relative rotation and it briefly comprises in part a uniquely coded or characterized pattern applied to the surface of the rotor element. Generally the pattern comprises a plurality of spirally arranged spaced contrasting areas on the rotor. In one embodiment of the invention the pattern includes a spiral helix of equally spaced contrasting circular spots, the helix commencing at one pole of the spin axis and terminating at the other pole of the spin axis. The unique pickoff means further includes a plurality of pickoffs or sensors adapted to receive radiation from the rotor and to produce signals indicative of the radiation sensed thereby. In one specific embodiment of the invention the pickoffs include three orthogonally arranged optical pickoffs adapted to sense light from the rotor.

For any spin axis orientation of the rotor relative to the support means, each of the three orthogonally placed pickoffs will trace a minor circle over the rotor surface and each minor circle must intersect the spiral helix once per rotor revolution. Generally the helix will have a relatively low pitch to it so that each intersection between the minor circles traced by the pickoffs and the helix will be a relatively parallel one. Accordingly, for each intersection the corresponding pickoff output will be a group of pulses whose frequency is proportional to the sine of the angle between the pickoff and the rotor spin axis. To explain, the closer the pickoff is to the equator, the greater will be the number of pulses generated in a given length of time and conversely the closer the pickoff or sensor is to the pole, the smaller will be the number of pulses sensed during the same interval of time. The actual pulse rate of the pickoff has been found to be the desirable way of utilizing the output information. Generally the pulse rate is proportional to the sine of the angle between the pickoff and the rotor spin axis. The pulse rate can be easily and accurately measured. Thus each of the three orthogonally arranged pickoffs produces a signal indicative of the sine of the angle between it and the rotor spin axis. By thus providing three signals each having a frequency indicative of its pickoff angle relative to the spin axis, it will be understood that the three signals may be applied to a suitable computer means for computing the position of the support means relative to the spin or polar axis of the rotor.

It is an object of this invention therefore, to provide an improved control apparatus and more specifically to provide a pickoff for measuring relative rotation between a universally supported spinning sphere and its support member about any axis at an angle to the spin axis of the spinning sphere.

Another object of the invention is to provide in combination with a support member and a spherically shaped spinning rotor supported thereby a pickoff means characterized by producing a signal which has a pulse rate as a function of the relative latitude of the pickoff relative to the spinning rotor.

Other and more specific objects of the invention, including constructional details and the operation of pickoffs embodying my invention, will be set forth more fully in and become apparent from a reading of the following specification and appended claims, in conjunction with the accompanying drawings in which:

FIGURE 1 is a schematic representation of a gyroscope comprising a rotor element universally supported on a support means and having associated therewith three radiation sensing devices or pickoffs orthogonally positioned;

FIGURE 2 is a representation of the spin reference axis of the gyroscope with respect to the sensing axes of the radiation sensors for one specific embodiment of the invention;

FIGURE 3 is a view of a spherically shaped rotor element showing the spiral helix pattern applied thereto;

Figure 4:
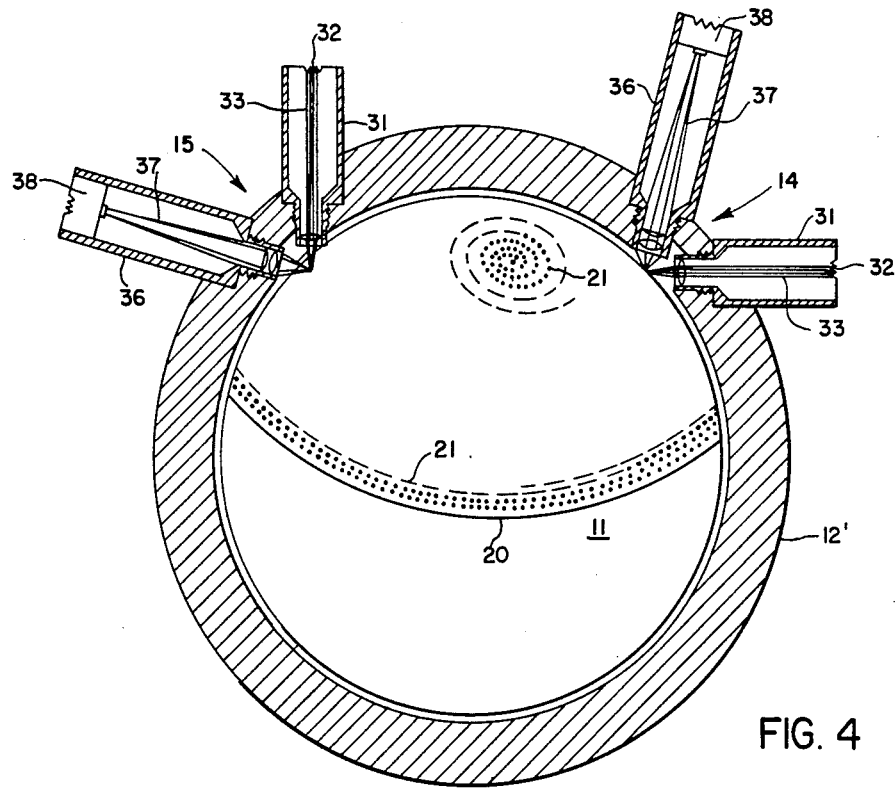
FIGURE 4 is a view of the rotor element with its associated support means and showing two of the three orthogonally positioned optical pickoffs.

Referring to FIGURE 1, the reference numeral 10 generally depicts a gyroscope comprising in part a spherically shaped rotor element 11 universally supported relative to a support means 12 by any suitable means such as an air bearing well known to those skilled in the art. The rotor element 11 is adapted to be rotated about a spin axis 13 relative to support 12 and generally will remain fixed in inertial space subject to precessional errors caused by torques tending to rotate the gyro about an axis at an angle to the spin reference axis. The actual means for impelling the rotor so as to cause it to spin about the spin reference axis 13 are not shown but it will be understood that any suitable means may be used.

A plurality of radiation sensors 14, 15 and 16 are positioned by suitable means relative to the rotor 11 and are adapted to receive radiation from the rotor 11. As shown the radiation sensors 14–16 are orthogonally positioned with respect to each other and this is best indicated in FIGURE 2 wherein the reference numerals 14', 15', and 16' respectively identify the principal axes of the sensors 14, 15, and 16. The general relationship between the sensitive axes of the pickoff means and the spin reference axis 13 and the rotor 11 is also shown in FIGURE 2.

FIGURE 3 shows a perspective view of the rotor element 11 with the spin reference axis again indicated by numeral 13 and where the equator is generally designated by reference numeral 20. As shown, the rotor has applied thereto a unique pattern comprising a spiral helix of equally spaced contrasting circular spots, the helix being generally identified by the reference numeral 21. The individual contrasting circular spots are identified by the reference numeral 22 and are shown individually numbered in FIGURE 5. As shown, the spiral helix commences at one pole defined by the spin axis 13 and terminates at the other pole of the spin axis. For some applications it may be desired to have the entire sphere covered with the spiral helix pattern while in other applications it may be sufficient to cover only a portion of the sphere. As shown in FIGURE 3 the entire sphere has not been shown covered for purposes of clarity.

As used herein the expression "contrasting" shall be understood to mean a broad family of means for producing a variation in radiation so that suitable pickoff means will provide different signals as a function of whether they are "viewing" a spot on the rotor or some other area on the rotor. Generally, the spots 22 may have any desired type of configuration, those shown being circular but other shapes will work equally as well. Also, as used herein, the expression or term "radiation" or "radiative" should be understood to include a wide variety of surface properties. Although the invention will be specifically described in connection with surfaces which are either light reflective or nonlight reflective, it will be understood that the invention applied equally as well to surface properties which are also broadly radiative or non-radiative. For example, the surfaces may be characterized by either being fluorescent or non-fluorescent; by being either opaque or translucent; by being either opaque or transparent; by being either magnetic or non-magnetic; or by being either radioactive or nonradioactive. It is not intended that this be considered a complete list of possible combinations but is merely indicative of the range of the invention.

Referring to FIGURE 4, the rotor element 11 is again depicted in perspective and is shown enclosed by a supporting element having the general configuration of a hollow sphere and which is identified in FIGURE 4 by the reference numeral 12'. Two of the three orthogonally positioned pickoffs are shown. As indicated, these pickoffs are of the optical type and each includes a source of light adapted to project a "pin-point" of light onto the surface of the rotor 11 and also includes means for "viewing" the spot or area on the rotor so illuminated by its associated illumination means. More specifically each pickoff includes a light producing member 31 including a housing portion fixed relative to the support 12' and adapted to extend through a suitable aperture therein. A means such as a filament 32 is adapted to produce light rays 33 which are condensed by suitable means to focus the beam or pinpoint of light on the surface of the rotor. Each pickoff also includes another housing element generally identified by the reference numeral 36 secured to the housing 12' and adapted as shown to fit in a suitable aperture therein and having its principal axis thereof aligned to intersect with the principal axis of the light producing means at the periphery of the rotor element. The sensing means 36 includes an optical system for receiving light rays emanating from the point or area on the surface of the rotor illuminated by the illumination means and to focus the light rays so emanating on a light sensitive signal producing means generally identified by the reference numeral 38. Thus the light rays 37 received from the surface of the rotor impinge upon the signal producing means 38 so as to produce a signal indicative of the light or radiation received thereby.

Figure 5:
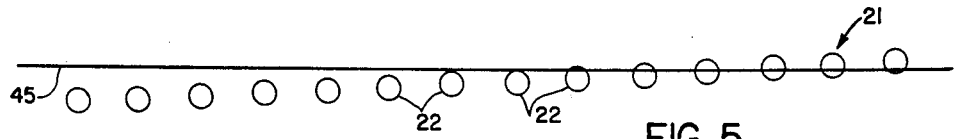
FIGURE 5 is a view of a portion of the pickoff pattern on the rotor surface relative to a latitude line.

As indicated above, for any given spin axis orientation of the rotor element relative to the support member, each of the three orthogonally placed pickoffs will trace a minor circle over the rotor surface and each minor circle must intersect the spiral helix once per rotor revolution. In FIGURE 5 a portion of the surface of the rotor element 11 has been reproduced showing one portion of the spiral helix 21. A minor circle generally identified by the reference numeral 45 may be considered to represent any of the minor circles that the three pickoffs would trace over the rotor surface as the rotor spins. As shown the minor circle 45 intersects the line of equally spaced circular spots 22 of the spiral helix 21. Thus, the pickoff which at this instant is tracing the minor circle 45 would be producing a series of pulsed outputs or signals indicative of the number of contrasting spots 22 that it "saw" for this particular orientation. Accordingly, there will be a certain frequency of pulses in the signal output from this pickoff. It will be understood that should the support means 12' shift or rotate relative to the rotor element 11 that the latitude between the pickoffs and the rotor will change and that the minor circles traced by the pickoffs will also shift either toward or away from the poles of the rotor. As the minor circles shift it will be understood that the pickoffs will see either more or fewer contrasting spots on the surface of the rotor and that the frequency of the signals thereof will shift accordingly.

Figure 6:
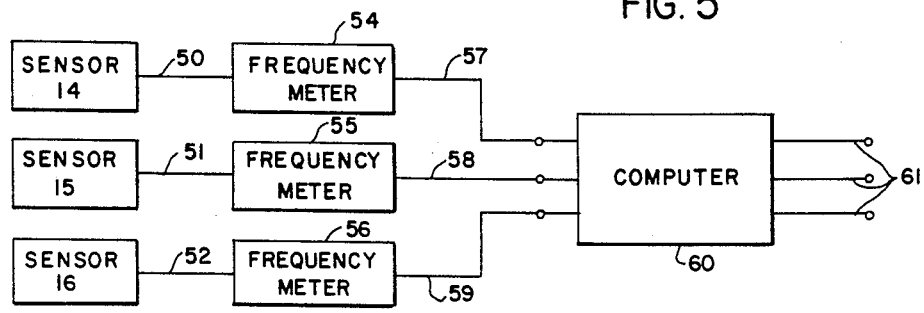
FIGURE 6 is a block diagram showing the sensors and frequency meters and computer by which the signals may be utilized for computing the relationship between the spin axis of the rotor and the support.

In FIGURE 6, each of the sensors 14, 15, and 16 is depicted in block diagram form. Each has an output lead which are respectively identified by reference numerals 50, 51 and 52 and are provided so as to connect the sensors 14, 15 and 16 respectively to frequency meters 54, 55, and 56. The frequency meters 54, 55, and 56 provide the function of receiving signals from the sensors 14, 15, and 16 and providing outputs which are indicative of the frequencies sensed thereby. Such frequency meters may take a wide variety of forms and are readily available. The frequency meters 54, 55 and 56 respectively are provided with output leads 57, 58 and 59 which are all shown connected to a suitable computer means 60 which provides the function of receiving three signals indicative of three relative latitudes represented by frequencies indicative thereof and for computing output signals at leads 61 which are indicative of the true angular relationships between the support means 12 and the spin reference axis 13 of the rotor. It will be understood that by having three orthogonally spaced pickoff members positioned about the perforated rotor element and by having means for each of said pickoffs to produce a signal indicative of its relative latitude with respect to the rotor, it then is a relatively straight forward computation by known computing means to combine the individual latitude information and produce output signals indicative of the angular relationship between the support means and the spin axis 13 of the rotor. In one embodiment the computer 50 would provide the roll and pitch attitude of a dirigible craft as it moves in space relative to its fixed reference axis defined by the spin reference axis 13 of the rotor 11.

The computer 60 will take its simplest form when the three pickoff axes are as indicated, orthogonally arranged. However, the pickoffs 14, 15 and 16 may be separated by other angles within the scope of the invention. For angles other than 90° as shown, the computer will have additional complexity but can be accommodated as long as the actual angular relationships are known.

While I have shown and described a specific embodiment of this invention, further modifications and improvements will occur to those skilled in the art. I desire to be understood, therefore, that this invention is not limited to the particular form shown. I intend in the appended claims to cover all modifications which do not depart from the spirit and scope of this invention.

What I claim is:

1. In apparatus of the class described: a support; a spherically shaped rotor universally supported by said support and adapted to be rotated about a spin axis; and means for measuring relative rotation between said rotor and said support about any axis at an angle to said spin axis, said measuring means comprising a spiral helix of equally spaced contrasting circular spots on said rotor, said helix commencing at one pole of said spin axis and terminating at the other pole of said spin axis, a source of light on said support illuminating at least a portion of said rotor, and a plurality of optical pickoffs orthogonally positioned on said support and adapted to sense light from said rotor, each of said pickoffs including means for producing signals indicative of light sensed thereby.

2. In apparatus of the class described: a support; a spherically shaped rotor universally supported by said support and adapted to be rotated about a spin axis; and means for measuring relative rotation between said rotor and said support about an axis at an angle to said spin axis, said measuring means comprising a plurality of spirally arranged spaced contrasting areas on said rotor commencing at one pole of said rotor and terminating at the other pole of said rotor, and a plurality of radiation sensitive pickoffs orthogonally positioned on said support and adapted to sense radiation from said rotor, each of said pickoffs including means for producing signals indicative of radiation sensed thereby.

3. In apparatus of the class described: a support; a rotor having a curved periphery universally supported by said support and adapted to be rotated about a spin axis; and means for measuring relative rotation between said rotor and said support about an axis at an angle to said spin axis, said measuring means comprising a plurality of spirally arranged spaced areas on the surface of said rotor, said spaced areas commencing at one pole of said rotor and terminating at the other pole of said rotor, and said spaced areas having substantially different radiation characteristics from the remaining surface of said rotor, and radiation sensing means on said support and adapted to sense radiation from said rotor, said sensing means including means for producing signals indicative of radiation sensed thereby.

4. In apparatus of the class described: a support; a rotor having a curved periphery, being universally supported by said support and adapted to be rotated about a spin axis; and means for measuring relative rotation between said rotor and said support about an axis at an angle to said spin axis, said measuring means comprising a plurality of spaced areas on the surface of said rotor spirally extending about the periphery of said rotor and having substantially different radiation characteristics from the remaining surface of said rotor, and radiation sensing means positioned on said support and adapted to sense radiation from said rotor.

5. In apparatus of the class described: a support; a rotor having a curved periphery, being universally supported by said support and adapted to be rotated about a spin axis; and means for measuring relative rotation between said rotor and said support about an axis at an angle to said spin axis, said measuring means comprising a plurality of spaced areas on the surface of said rotor spirally extending about the periphery of said rotor and having substantially different radiation characteristics from the remaining surface of said rotor, and radiation sensing means positioned on said support and adapted to sense radiation from said rotor, and including means for producing signals indicative of radiation sensed thereby, and means connected to said sensing means adapted to produce an output signal indicative of pulses received thereby.

References Cited in the file of this patent
UNITED STATES PATENTS
2,942,479    Hollmann _____ June 28, 1960